United States Patent
Sang et al.

(10) Patent No.: US 9,639,245 B2
(45) Date of Patent: *May 2, 2017

(54) SYSTEM AND METHOD FOR INTERACTIVELY DELIVERING EXPERT INFORMATION TO REMOTE OUTLETS

(71) Applicant: Clairvista LLC, Long Grove, IL (US)

(72) Inventors: Christopher Sang, Long Grove, IL (US); Donald Christopher Woods, Chicago, IL (US)

(73) Assignee: CLAIRVISTA LLC, Long Grove, IL (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/172,478

(22) Filed: Feb. 4, 2014

(65) Prior Publication Data

US 2014/0157137 A1 Jun. 5, 2014

Related U.S. Application Data

(63) Continuation of application No. 13/034,426, filed on Feb. 24, 2011, now Pat. No. 8,650,147, which is a
(Continued)

(51) Int. Cl.
*G06F 17/00* (2006.01)
*G06N 5/02* (2006.01)
(Continued)

(52) U.S. Cl.
CPC .......... *G06F 3/0484* (2013.01); *G06Q 30/06* (2013.01); *G06Q 30/0623* (2013.01)

(58) Field of Classification Search
CPC combination set(s) only.
See application file for complete search history.

(56) References Cited

U.S. PATENT DOCUMENTS 7,512,579 B2 * 3/2009 Sang .................. G06Q 30/06
706/45
7,899,774 B2 * 3/2011 Sang .................. G06Q 30/06
706/45
(Continued)

OTHER PUBLICATIONS

Intelligent Route Optimization Technology by Case Based GA Takaaki Motomura; Masaki Suzuki; Setsuo Tsuruta; Yoshitaka Sakurai 2013 International Conference on Signal-Image Technology & Internet-Based Systems Year: 2013 pp. 351-357, DOI: 10.1109/SITIS.2013.64 IEEE Conference Publications.*
(Continued)

*Primary Examiner* — Michael B Holmes
(74) *Attorney, Agent, or Firm* — Leydig, Voit & Mayer, Ltd.

(57) ABSTRACT

A networked interactive expert system is disclosed for selectively providing relevant expertise when a user requires such assistance. System provides a set of networked facilities for determining an expertise needed by a customer based on a location. Such location can be either physical or logical. A physical "location" corresponds, for example, to a department within a retail outlet. Examples of logical "locations" are ones corresponding to a web-page, a product identification code of interest, a customer identification code, and/or explicit knowledge category selected by the customer. An expert studio, from a list of expert studios providing expertise corresponding to the identified location associated with the customer's request, is matched up with the request. Thereafter, a primary connection, supporting an interactive videoconference session, is established between a first networked node associated with the customer and a second networked node associated with the designated expert studio.

20 Claims, 5 Drawing Sheets

Related U.S. Application Data continuation of application No. 12/412,116, filed on Mar. 26, 2009, now Pat. No. 7,899,774, which is a continuation of application No. 11/305,610, filed on Dec. 16, 2005, now Pat. No. 7,512,579.

(60) Provisional application No. 60/637,200, filed on Dec. 17, 2004.

(51) Int. Cl.
*G06F 3/0484* (2013.01)
*G06Q 30/06* (2012.01)

(56) References Cited

U.S. PATENT DOCUMENTS

| | | | | |
|---|---|---|---|---|
| 8,650,147 | B2* | 2/2014 | Sang | G06Q 30/06 706/50 |
| 2006/0190344 | A1* | 8/2006 | Sang | G06Q 30/06 706/50 |
| 2009/0182885 | A1* | 7/2009 | Sang | G06Q 30/06 709/228 |
| 2011/0238531 | A1* | 9/2011 | Sang | G06Q 30/06 705/26.61 |
| 2014/0157137 | A1* | 6/2014 | Sang | G06Q 30/06 715/738 |

OTHER PUBLICATIONS

A collaborative workspace architecture for strengthening collaboration among space scientists Arturo S. Garcia; David J. Roberts; Terrence Fernando; Christian Bar; Robin Wolff; Janki Dodiya; Wito Engelke; Andreas Gerndt IEEE Aerospace Conference Yr: 2015 pp. 1-12, DOI: 10.1109/AERO.2015.7118994 IEEE Conference Publications.*

Heterogeneous network facility for distance education for parents and rehabilitation professionals in the field of intellectual disability K V Johny; Harish G; Bejoy Dickson 2013 12th International Conference on Information Technology Based Higher Education and Training (ITHET) pp. 1-4, DOI: 10.1109/ITHET.2013.6671034 IEEE Conference Publications.*

LsM: A new location and emotion aware web-based interactive music system Hao Liu; Jun Hu; Matthias Rauterberg 2010 Digest of Technical Papers International Conference on Consumer Electronics (ICCE) Year: 2010 pp. 253-254, DOI: 10.1109/ICCE.2010.5418750 IEEE Conference Publications.*

* cited by examiner

SYSTEM AND METHOD FOR INTERACTIVELY DELIVERING EXPERT INFORMATION TO REMOTE OUTLETS

CROSS-REFERENCE TO RELATED APPLICATION

This patent application is a continuation of U.S. patent application Ser. No. 13/034,426, filed Feb. 24, 2011, which claims priority to U.S. patent application Ser. No. 12/412,116, filed Mar. 26, 2009 (now U.S. Pat. No. 7,899,774), which claims priority to U.S. patent application Ser. No. 11/305,610, filed Dec. 16, 2005 (now U.S. Pat. No. 7,512,579), which claims priority to U.S. Provisional Patent Application No. 60/637,200, filed Dec. 17, 2004, the contents of which are expressly incorporated herein by reference in their entirety, including any references therein.

AREA OF THE INVENTION

The present invention generally relates to the areas of networked systems capable of providing live audio/video/data services to multiple remote locations, and more particularly to applications of such systems to provide live interactive expert advice/counseling/customer service via audio/video/data communications media to customers (recipients of expert information/guidance) present at potentially many distinct physical locations. Potential subject-matter areas incorporating such technology include, for example, retail outlets, automated teller machines, self check-in machines for airlines and hotels, e-commerce terminals, health care/clinics, manufacturing sites or any other professional or commercial operations. The information/guidance provided via such systems relates, for example, to products, services or processes.

BACKGROUND OF THE INVENTION

Retail sales establishments have changed to reflect customers' enhanced awareness of prices offered for similar goods by competing retail establishments. Within the retail industry, during the past three decades, discount, warehouse and mass-merchandiser formats have steadily grown at the expense of high service retailers. These formats, adopted by companies such as, for example, Wal-Mart, Target, and Costco now dominate many retail categories. Low price, self-service retail business formats share a common characteristic—their focus on low prices has led to minimizing the money spent on store personnel, thus reducing the number, caliber and knowledge level of people staffing the stores. Even large specialty retailers such as Best Buy, Circuit City, Walgreen's, Petsmart and Home Depot cannot consistently deliver the in-depth product expertise that customers find desirable and often need on a retail sales floor.

To compete with the prices offered by warehouse retailers, most retailers have abandoned/shed the role/responsibility of being a consumer's agent or advisor. Instead, many retailers today are effectively retail floor space real estate operators, stocking their shelves with whatever goods their suppliers and/or manufacturers produce and market. Under such arrangements, sales associates are no longer experts in the goods sold by the retailer, and the retailers provide minimal product expertise or guidance on the sales floor.

The absence of experienced sales associates harms consumer satisfaction with retailers. The overall trend of eliminating access to experienced sales associates is probably not a significant problem for consumers with regard to products that do not require expertise when making a purchase decision, but for many categories of products such as consumer electronics, appliances, home improvement products and personal care products the average consumer is often frustrated by the absence of qualified personnel on sales floors to help the consumer make informed purchase decisions. The result has been lost sales opportunities and eroding customer loyalty for retailers, and consumers spending a significant amount of time researching products or making poorly informed purchase decisions.

Providing truly expert, not rudimentary, product knowledge through one-on-one interaction with customers at multiple departments across hundreds or even thousands of store locations is extremely expensive. Such costs, by necessity, are passed by retailers to their customers. Mass marketers' business models depend on keeping their prices lower than rivals' prices. Thus, delivering expertise on the sales floor through one-on-one human interaction, without significantly adding to operating costs, can create a significant competitive advantage for retailers.

Airlines and hotels have also sought to reduce customer service costs. Self-service kiosks that enable customers to check-in and checkout have gained broad acceptance in the airline and hotel industries. However, when a customer has an issue or a question, the customer must seek out a live customer service representative to assist them. Often such a representative is not available, or they are engaged in helping other customers. Airlines and hotels must, in turn, maintain a greater level of on-site staffing than they would otherwise require and contend with frequent peaks and valleys in the level of customer demand for live human assistance that self-service kiosks do not provide. A result of attempts to staff live, on-site, customer assistance desks is excessive staffing at certain times and under-staffing at other times—the exact problem (understaffing) that self-service kiosks were meant to alleviate in the first place.

Yet another area of retail sales that is potentially affected by a shortfall in expertise with regard to a particular product offered for sale is electronic commerce. In electronic commerce, real-time online interaction with customer service or technical support agents through such vehicles as "live chat" is potentially an important service to customers. However, generally there is no effective way for an electronic commerce retail sales service provider to anticipate the types of questions of any particular customer. The customer is directed to a common pool of customer service agents rather than to a particular agent or agent pool most qualified to address the customer's needs. In this environment, customers are dissatisfied with the support provided by service agents because the agents to which the customer enquiries are directed often lack the specific expertise or knowledge required to address the customer's inquiry. One solution presently used to select an appropriate stable of customer service personnel is to require a user to traverse a touchtone-based decision tree before seeking to direct a caller's inquiry to a particular stable of customer service personnel.

Expert advice in health services and products is generally restricted to doctors' offices and clinics. Health care is an industry where product knowledge for medications (both prescription and over-the-counter) and the knowledge to operate medical equipment or devices are critical in delivering safe and effective products and services. This is an ever increasing challenge because the number and types of medications and medical equipment and devices are proliferating throughout the industry. However, pressure to contain rising health care costs limits staffing and training in this very important area. Having the full breadth and depth of expertise at every location, as well as during all hours, where health care products are sold or services are rendered (e.g., each department within a hospital, physician offices, drug stores, etc.) is generally impractical.

SUMMARY OF THE INVENTION

The present invention comprises a networked system (and related methods) for selectively providing relevant expertise when a user requires such assistance. Such networked system is potentially highly beneficial to both consumers and providers within a wide variety of areas involving retail sales of goods and services.

The present invention provides a set of networked facilities for determining an expertise needed by a customer based on a location. Such location can be either physical or logical. A physical "location" corresponds, for example, to a department within a retail outlet. Examples of logical "locations" are ones corresponding to a web-page, a product identification code of interest, a customer identification code, and/or explicit knowledge category selected by the customer. An expert studio, from a list of expert studios providing expertise corresponding to the identified location associated with the customer's request, is matched up with the request. Thereafter, a primary connection is established between a first networked node associated with the customer and a second networked node associated with the designated expert studio.

Furthermore, in accordance with an embodiment of the invention, an on-demand content sharing facility is incorporated whereby content is provided to the first networked node on-demand via a secondary connection.

BRIEF DESCRIPTION OF THE DRAWINGS

While the claims set forth the features of the present invention with particularity, the invention, together with its objects and advantages, may be best understood from the following detailed description taken in conjunction with the accompanying drawing of which:

DETAILED DESCRIPTION OF THE DRAWINGS

Before referring to specific drawings, it is generally noted that embodiments of the invention are described herein as "interactive expert systems." Particular embodiments of interactive expert systems incorporating the present invention provide expert guidance/knowledge for consumers at retail sales outlets. Other embodiments provide expert guidance/knowledge in a variety of customer service settings including: airports, hotels, banks and health care. In yet other embodiments, such as an e-commerce context, the customer's logical location on the Internet (e.g., a web site, page or area within a web page selected by a user) is used to proactively determine the customer's area of interest and make available specific expertise that corresponds to the area of interest.

Figure 1:
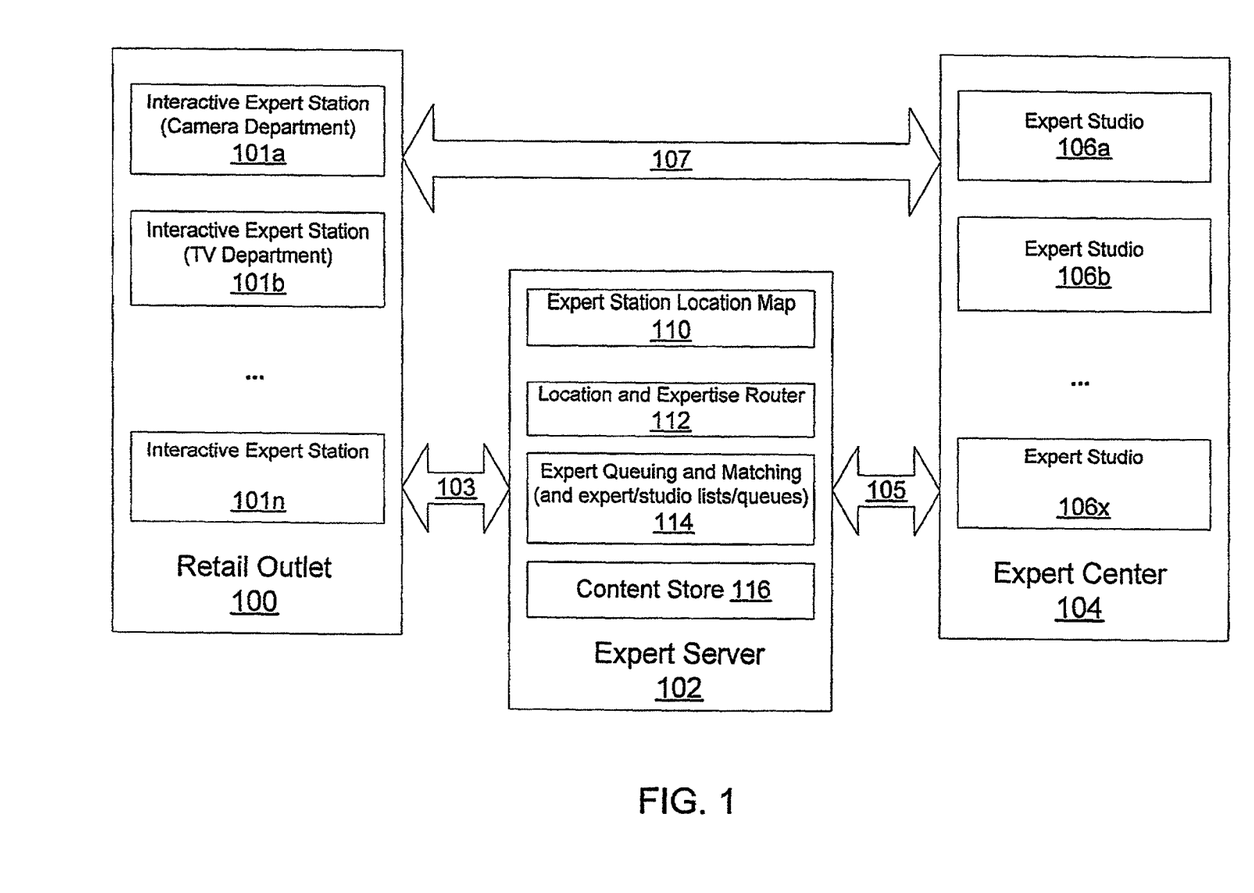
FIG. 1 is a schematic drawing depicting a system embodying the present invention in the form of multiple outlets communicatively linked to an expert center for serving the outlets.

Turning to FIG. 1, an exemplary embodiment of the interactive expert system is schematically depicted that includes a set of networked components. A retail outlet 100 (one of potentially many outlets in the interactive expert system) includes a set of interactive expert stations 101*a-n*. The retail outlet 100 is segmented by categories of products or services, also referred to herein as "departments." Such departments are, for example, camera, television, appliance, stereo sections of an electronics/appliance store. One or more of the interactive expert stations 101*a-n* are provided for supported categories. The interactive expert stations 101*a-n* provide access to expert knowledge/guidance on an on-demand interactive basis for the supported categories corresponding to products and services in a particular department of the retail outlet 100.

In general, the interactive expert stations 101*a-n* are placed within the retail outlet 100 to provide access to expert information/guidance for assisting customers with corresponding products and/or services provided at the particular locations. More particularly, the interactive expert stations 101*a-n* (e.g., kiosks) are placed at various locations within the retail outlet 100. Each interactive expert station is associated with a class/category of expertise/knowledge corresponding to an area of expertise required by customers at a particular location containing the particular interactive expert station. The various locations of the interactive expert stations 101*a-n* correspond, for example, to departments of the retail outlet, particular products, a particular supplier, etc. In an exemplary embodiment, each interactive expert station is assigned a unique identification, and the station identification is registered in a location map (e.g., logical, geographic, etc.) that ties the interactive expert station to a location (and thus a particular type of expertise needed for requests from the particular interactive expert station).

Once a particular location is selected for one of the interactive expert stations of the set of stations 101*a-n*, a category of expertise can be assigned to the interactive expert station. Creating station-specific associations between each of the interactive expert stations and categories of expertise facilitates automating selection of a particular remote expert studio to meet expertise needs associated with each particular interactive expert station. Establishing such associations and thereafter using the associations to establish an interactive session between a user/customer at a particular interactive expert station and one of a set of experts uniquely capable of providing a particular type of expert information/guidance is described further herein below.

Each of the interactive expert stations 101*a-n* includes a number of communications and input-output (I/O) devices. For example, while not specifically identified in FIG. 1, each interactive expert station includes an audio/video conferencing system including a video display, speakers, video camera, and microphone that support a full-duplex A/V session (videoconference) between a customer and an expert. Additional software and communications drivers on the interactive expert stations enable the retrieval and presentation of content on the interactive expert stations at the direction/discretion of experts providing guidance to customers using the interactive expert stations. A single physical interface supports both the videoconference and content sharing functionality—though each is, by way of example, supported by one or more separate network connections and/or sessions.

The interactive expert stations 101a-n include a variety of user-manipulated I/O components. By way of example, the interactive expert stations 101a-n include a barcode scanner enabling customers to scan a product's UPC barcode to indicate a particular product for which expert information/guidance is requested. The interactive expert stations 101a-n also potentially include a magnetic stripe or barcode card scanner enabling identification of a customer desiring interactive expert assistance by swiping, for example, a loyalty card distributed by the particular retail organization. A customer profile/class associated with the customer ID encoded on the swiped card is potentially used to determine the type of expert assigned to the customer. Each interactive expert station is also optionally equipped with a keyboard and mechanical buttons/switches. Yet other potential I/O mechanisms incorporated into the interactive expert stations are touch screens for enabling customers to select from a list of expertise categories supported by particular interactive expert stations.

Having described physical components of the interactive expert stations 101a-n, attention is now directed to software components within the interactive expert stations and their associated functional capabilities. Each of the interactive expert stations 101a-n includes software components for maintaining/managing: (a) an interaction prompter including a multimedia attract loop informing customers of the availability of expert advice via an interactive expert videoconference session supported by the station, (b) interactions between customers, applications/modules installed on the stations 101a-n, including software for custom videoconferencing components or a third-party videoconference system, and devices to control the interactive expert stations 101a-n, (c) interactions with an expert server 102—such as requesting an available expert with the expertise associated with the station's current location (physical and/or logical), (d) integration with custom videoconferencing components or a third-party videoconference system running and operating in association with an interactive expert station, (e) configuration and communication to the expert server 102 of an ID for the interactive expert station, and (f) the download and application of content and system updates to the interactive expert stations.

With regard to the aforementioned interaction prompter, a multimedia attract loop generates for display, by way of example, content that prompts customers to commence a session with an interactive expert for one-on-one guidance on products or services available at a customer's location. The attract loop is broken, for example, when a motion sensor or voice/speech recognition module/component senses the presence of a customer that potentially desires initiating an interactive session with an expert. A customer responds to the attract loop by requesting an expert using one of several potential methods/interfaces, including, for example: a touch screen, voice/speech recognition modules, motion sensors, discrete buttons, keyboards, barcode scanners, and magnetic strip or barcoded card readers. Customers can also be presented a set of experts from which to select (using one of the available I/O components mentioned, by way of example, above) based on the customers' personal needs/preferences, such as type of language proficiency, gender, psychographic profile, etc.

The expert server 102 facilitates/manages establishing sessions between customers at retail outlets and desired experts located in remote studios. The expert server 102 is, by way of example, a centrally (communicatively, logically) positioned software facility that serves as an administrative data and expert services session management hub of the interactive expert system. As explained further herein below, the expert server 102 also operates as a repository/provider of content selectively provided to and presented by interactive expert stations 101a-n. It is noted that the expert server 102, while shown as a single logical component in the schematic drawing in FIG. 1, potentially comprises multiple physical computing nodes coupled to a network (or networks). It is further noted that the expert server 102, in embodiments of the present invention, serves multiple retail outlet instances of the type represented schematically by the retail outlet 100.

The expert server 102 facilitates establishing a videoconference session between a customer (at one of the interactive expert stations 101a-n) desiring a particular category of expert advice and an appropriate provider of expert information/guidance (within one of a set of expert studios 106a-x associated with an expert center 104). In support of this function, the expert server 102, by way of example, maintains data comprising (1) a listing of expertise needed at each of a set of identified locations containing one or more of the interactive expert stations 101a-n, and (2) a listing of available experts and their associated areas/categories/classes. The expert server 102 initially receives a request, from one of the interactive expert stations 101a-n of the retail outlet 100 via customer administrative connections 103, for expert information/guidance from the expert center 104 (described herein below) comprising a set of expert studios 106a-x that play host to a set of live human experts. The expert server 102 consults the listings of expertise needed by a requesting expert station and expert information/guidance provided by available experts at the expert center 104 to initiate, via messages passed on expert administrative connections 105 and/or customer administrative connections 103, a pairing between the requesting station and an appropriate expert. In exemplary embodiments of the invention, videoconference connections 107 supporting the interactive videoconference sessions between the expert stations 101a-n and designated ones of the expert studios 106a-x are direct—i.e., the videoconference data streams do not pass through the expert server 102. The above-described manner of selecting an appropriate expert selection and initiating customer/expert sessions avoids a potential communications bottleneck at the expert server 102. Components of the expert server 102 that facilitate the aforementioned functionality are described further herein below.

The expert server 102 includes an expert station location map 110 that comprises tables and/or any other suitable data structures for maintaining a registry of information, for each registered location in the interactive expert system, comprising, for example: (a) a location description/identification (e.g., a retail outlet address and, if applicable, a specific department within a particular retail outlet), (b) expertise type(s) potentially required for the location so that the type of expertise needed by a station can be anticipated/inferred when the expert server 102 receives a request from a particular location, and (c) an identification of each interactive expert station assigned to the location. It is noted that location entries within the location map 110 can be defined narrowly or broadly and can be associated with a category of products, services or other forms of knowledge or content. In accordance with a preferred embodiment, the scope of each category corresponds, by way of example, to the scope of expertise supported/provided by a specific expert or group of experts.

The interactive expert station identification information under (c) is used, by way of example, to formulate a list of all interactive expert stations in the system and their corresponding locations. The station/location list is used by the expert server 102 to match an incoming request from a particular station to a location entry in the expert station location map 110 defining an expertise needed for the particular station/location. Thus, when an interactive expert station is relocated, its associated location is updated in the map 110 to ensure proper selection of an expert.

The expert server 102 includes a location and expertise router 112 that is responsible for selecting an available expert/studio in response to a customer's request for expert assistance. The location and expertise router 112 communicates with each of the interactive expert stations 101a-n either directly or through a local communications server computer/node through which the interactive expert stations 101a-n, of the retail outlet 100, communicate with the expert server 102.

In response to receiving a request for assistance from an identified interactive expert station at a particular outlet (or location within an outlet), the location and expertise router 112 applies the station identification and current location to the expert station location map 110 to determine a category of expertise required to provide assistance to a customer via the identified interactive expert station. Thus, the expert server 102, using the location and expertise router 112, infers a customer's information/guidance needs based upon the requesting interactive expert station's location. The location and expertise router 112 then issues a request for a particular category of expert to an expert queuing and matching component 114 (described below) of the expert server 102 to facilitate establishing a consultation connection/session with that the requesting customer. In addition to a particular class/category of expert, the request submitted by the router 112 to the matching component 114 potentially includes additional properties (user knowledge level, preferred language, etc.) that are utilized by the matching component 114 to provide a more particularly tailored expert/studio selection to fulfill the received request for expert information/guidance.

The location assigned to a requesting interactive expert station can be either physical or logical. The illustrative example, based upon a retail outlet store model, utilizes physical locations (e.g., distinct store departments) to determine a category of expertise needed to fulfill a customer's requests. However, for an e-commerce embodiment of the present invention, a customer's "location" is logical in nature and determined by, for example, a web-site, web-page or the specific area within a web-page the customer selects with click-through. Yet other examples of logical "locations" are ones corresponding to a product identification code of interest (rendered, for example, by a barcode scanner), a customer identification code (provided for example by a user/customer ID), and/or an explicit knowledge category selected by the customer.

Similarly, interactive expert stations can be either a physical or logical entity. Thus, a single physically networked node through which a customer requests interactive expert information/guidance may itself support multiple logical interactive network stations based upon a current mode of operation selected by a current user (e.g., a particular web page selected, or expertise choice selected from a list of choices presented by an attract loop operated by the networked node).

The expert queuing and matching component 114 of the expert server 102 is generally responsible for managing queues of available experts/studios associated with each of the available categories of expert information/guidance supported by the interactive expert system. In general, when a particular expert studio is selected to commence an interactive session with a requesting expert station, the expert studio is removed to the set of available experts/studios. When the session completes, the expert/studio is returned to the set of "available" expert/studio resources.

By way of example, and not limitation, the expert queuing and matching component 114 maintains a listing (using any one of a variety of data structures such as tables, queues, linked lists, etc.) of each registered expert/studio. The listing includes, for each registered expert/studio, an identification of a category of expertise and the current status (e.g., current availability) of the expert/studio. Examples of potential detailed statuses of expert studios include: interacting with customer, available for interaction, waiting in queue, staffed—not available, and not staffed. This system also changes the status of experts from one status to another, determines the experts/studios to be placed in the "available for interaction" state based on utilization patterns, and configures availability status parameters to ensure that a sufficient number of experts are available for interaction with requesting customers in each supported category/area of expertise.

The expert queuing and matching component 114 also maintains, by way of example, an association between each registered expert and one of the set of expert studios 106a-x in the expert center 104 to which each registered expert has been assigned. By way of example, the current studio assignment is maintained as a field/property within a queued registered expert record/object. The expert queuing and matching component 114 also manages the order/priority of each set of experts assigned to each category of available expertise that are available for requested interactive expert session requests.

The expert queuing and matching component 114, in response to receiving a request from the expertise router 112, matches the request with an appropriate one of the presently registered experts. In particular, the expert queuing and matching component 114 determines the availability of an expert corresponding to a category of expertise (determined by the "location" of the customer request's physical/logical origin) associated with the request. In an illustrative example, available experts are arranged in category-specific queues. If one or more experts are available in an appropriate queue, then one of the available experts is removed from the appropriate expert queue.

In an illustrative embodiment, after the expert queuing and matching component 114 determines the appropriate expert assignment, the matching component 114 initiates transmitting a notification to the requesting one of the set of interactive expert stations 101a-n. The notification to the requesting one of the stations 101a-n includes a network location/address and/or name of one of the expert studios 106a-x that contains the selected responsive expert. By way of example, the notification includes a universal resource identifier (URI) or universal resource locator (URL) that is thereafter used by the receiving one of the interactive expert stations 101a-n to initiate establishing an expert videoconference session/connection, using custom videoconference components or third party videoconference software, with the designated expert studio in the expert center 102.

It is noted that the expert queuing and matching component 114 incorporates a variety of methodologies for managing a set of experts based upon their expertise. The above illustrative example generally maintains lists of experts (in the form of category-specific queues) and their corresponding expertise category. However, more elaborate maintenance schemes are employed in alternative embodiments of the invention wherein each expert is associated with a set of defining properties that (1) facilitate tailoring expert selection based upon an expanded set of customer characteristics/needs, and (2) enable a single expert to provide expertise for multiple categories. A table in a relational database is constructed that includes a prioritized, system-wide set of expert records. With regard to experts and their designations to various categories and studio assignments, experts are potentially defined in their associated records according to specific products or services for which their expertise is provided—possibly covering multiple categories. Furthermore, the expert groups/qualifications are potentially further refined according to a set of properties including proficiency in various languages, gender, psychographic profile, etc.

When a request for a particular expert is received, the matching component 114 traverses the table of expert records, from highest to lowest priorities, to identify a highest priority available expert that matches a request from one of the stations 101a-n for expert assistance (including potentially multiple properties to be matched). The above-described data structures and functions associated with the expert queuing and matching component are illustrative. The content of the expert descriptions, the data structures containing the descriptions, and the manner of designating one of multiple available experts based upon a received request from one of the stations 101a-n vary in accordance with alternative embodiments of the invention.

The expert server 102 also includes a content data storage 116. The content data storage 116 maintains a variety of multi-media files that support the interactive sessions between the stations 101a-n and the studios 106a-x. For example, during a session, an expert may suggest a particular document, available as a PDF file, providing instructions on how to utilize a particular tool or product. The customer at an interactive expert station selects a provided interface control (e.g., an icon) to retrieve the document from the storage 116 and print the document on an attached printer at the interactive expert station. Alternatively, the customer does not need to activate a control to retrieve and view the content. Rather, the interactive expert station automatically requests the content from the storage 116 upon receipt of the shared content message from the expert studio. In other instances, a short video clip is downloaded from the storage 116 for viewing on the customer's station. In an embodiment of the invention, downloaded content is maintained (i.e., cached) at the receiving interactive expert station to reduce the need to download such content from the expert server 102 at some time in the future for subsequent presentations of the shared content to other customers. Such downloading of content is described further herein below.

The expert center 104 is a physical/logical structure that houses the set of expert studios 106a-x through which experts, having particular properties/expertise and assigned to particular ones of the studios 106a-x, supply their expertise. Expert advice is delivered from the studios 106a-x on a live, interactive basis to requesting customers at remote locations such as the retail outlet 100. The expert center 104 is potentially operated by an entity that is the same as (or affiliated with) a corporate entity that owns/operates the outlets, a third party contracted to perform such services, or individual manufacturers as a means of providing expertise for their products to the end customer on the sales floor. The studios 106a-x are located, for example, in a single building that is sub-divided into a set of individual studios. Alternatively, the studios 106a-x are distributed across a variety of remote locales (e.g., home offices). In yet other embodiments the expert studios 106a-x are located in the retail outlet 100 (in a backroom or other restricted area). On-duty experts are assigned to specific ones of the studios 106a-x within the expert center 104. The studio assignment information is registered in the available expert records maintained by the expert queuing and matching component 114.

By way of example, the expert studios 106a-x comprise workstations associated with the expert center 104. Each expert studio includes, by way of example, software components that are executed at the expert studio to manage: (1) availability status of the expert studio for selection by the expert queuing and matching component 114, and (2) communicating with the expert server 102 to provide information relating to incoming calls such as store or outlet ID and address, interactive expert station ID, outlet local time, etc. The expert studios 106a-x are similar to the interactive expert stations 106a-n at the retail outlet 100. Each of the expert studios 106a-x includes, for example, electronic audio/video systems (similar to the equipment at the stations 101a-n) used to videoconference with customers. However, each expert studio potentially includes additional equipment (e.g., monitors and interface controllers) and functional capabilities, such as application programs/systems for: (1) checking inventory availability and pricing for a specific item at the retail outlet 100 associated with an interactive expert station engaged in a videoconference, (2) viewing a customer's purchase history, (3) placing a product/shipping order for direct shipment of a product to a customer's address, and (4) retrieving and sharing additional information or images for products and services from a database (e.g., content storage 116). With regard to the last feature, the expert studio potentially invokes sharing content stored on the content storage 116 with a customer or alternatively provides live whiteboard demonstrations. Such additional information is provided, for example, by specific-purpose videoconference components, third-party videoconferencing software and/or third-party whiteboard/content sharing hardware/software components.

In an illustrative embodiment, the expert studios 106a-x also facilitate simulating a specific department environment for an outlet referred to as a "mirrored environment." For retail applications, each of the expert studios 106a-x potentially simulates/mirrors an environment of a specific department for certain outlets. Each expert studio 106a-x potentially includes store fixtures, lighting, signage and product placements, and an expert assigned to the studio is potentially dressed in the uniform worn by employees at the retail outlet 100 at which the customer is located. The effect is to create a highly approachable, "in store" interactive experience for customers—as if the expert were physically present on the sales floor.

Figure 2:
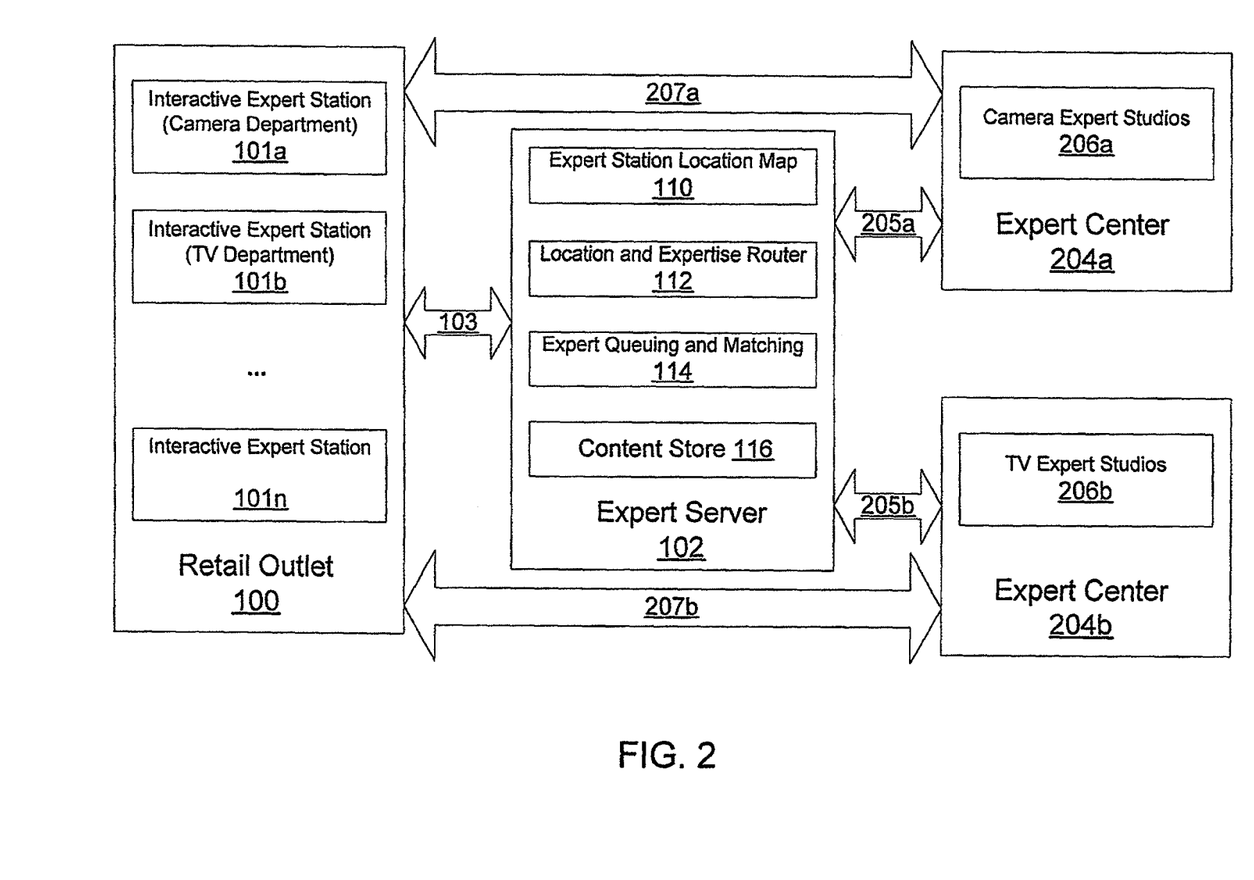
FIG. 2 is a schematic drawing depicting an alternative embodiment of the invention wherein multiple outlets are communicatively linked to multiple expert centers.

The interactive expert system embodying the present invention lends itself to a variety of network topographies that exploit high bandwidth network connections to support multi-media videoconference sessions between customers at interactive expert stations and remotely connected experts/studios. Turning briefly to FIG. 2, an illustrative alternative arrangement to the arrangement depicted in FIG. 1 is schematically depicted wherein the expert center 104 functionality is carried out by clusters of studios located at physically distinct expert center locales. The grouping of experts/studios at the distinct locales is established, for example, along classes of products (e.g., cameras, televisions) or services. In accordance with the illustratively depicted alternative embodiment depicted in FIG. 2, a first expert center 204a comprises a set of expert studios/experts 206a that provide expert information/guidance services for a first category/class (e.g., cameras) associated with the retail outlet 100. A second expert center 204b comprises a set of expert studios/experts 206b that provide expert information/guidance services for a second category/class (e.g., televisions) associated with the retail outlet 100. Connections 205a and 205b between the expert server 102 and the first expert center 204a and the second expert center 204b correspond to the connections 105 in FIG. 1. Connections 207a and 207b between the expert centers 204a and 204b and the interactive expert stations 101a and 101b correspond to the connections 107 in FIG. 1.

The various ways in which expert studios are arranged in a variety of locales is virtually limitless. In yet other embodiments, the grouping of experts/studios is based upon manufacturer. In that case, the interactive expert system facilitates manufacturers providing interactive support for their products or services directly to end customers at the outlet locations instead of relying upon the retail outlet manager to provide adequate training to sales associates at the retail outlet 100. In a highly decentralized expert support operation, the expert center functionality is embodied in a set of registered home offices for a set of expert studios. An appropriate mapping mechanism is maintained by the expert server 102 to support matching requests for assistance by customers via the expert stations 101a-n to appropriate remotely located expert studios/home offices.

Figure 3:
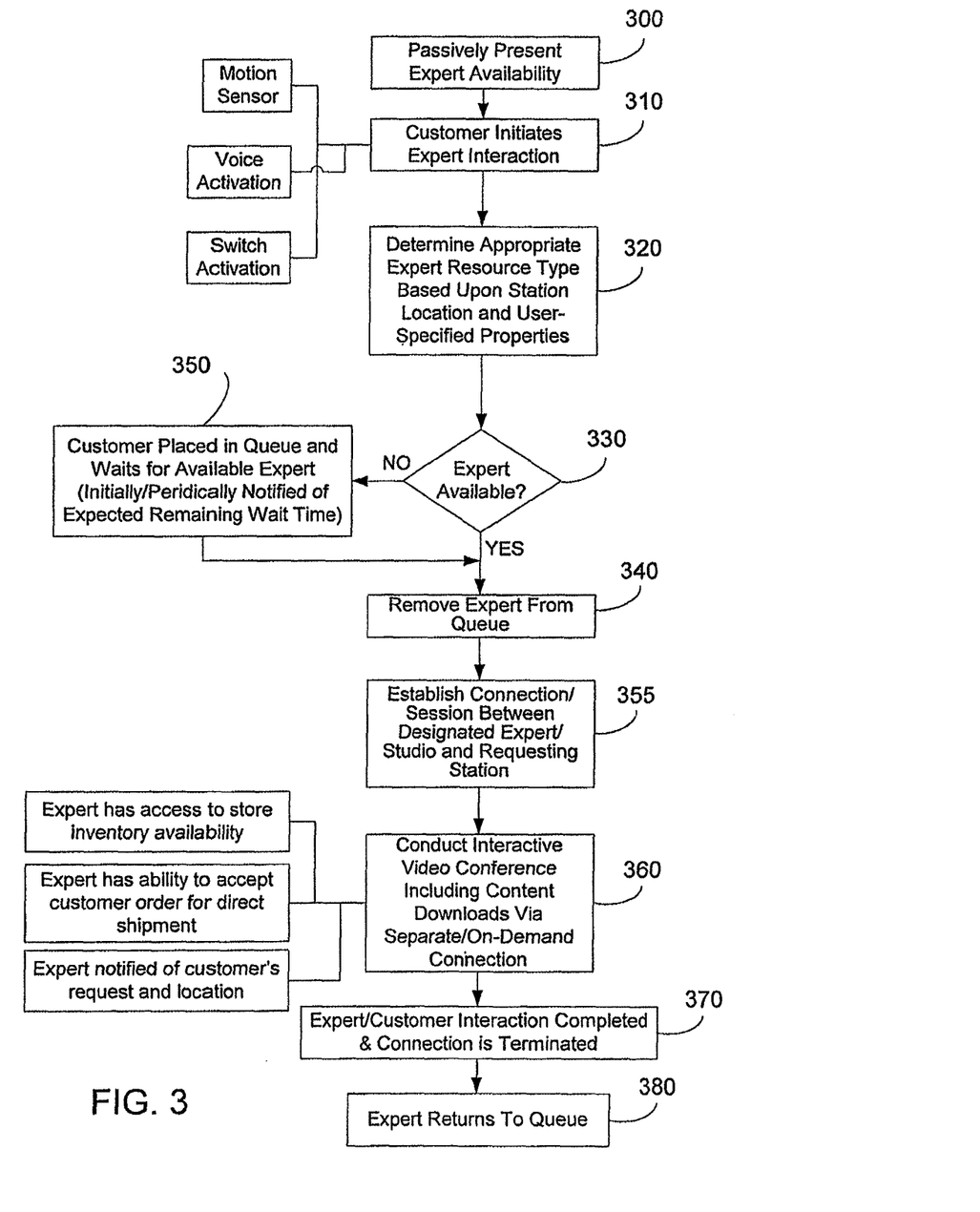
FIG. 3 is a flowchart depicting the general flow of decision-making and actions in carrying out a method for providing expert assistance that embodies the present invention.

Turning to FIG. 3, a flowchart summarizes a sequence of steps carried out by the expert system illustratively depicted in FIG. 1. Step 300 corresponds to an attract mode of operation of one of the interactive expert stations 101a-n wherein a video loop is played on a repeated basis until interrupted by a customer at step 310. Detecting a customer that may need/request help via the interactive expert system can occur in any of a variety of ways including, for example: (1) a motion sensor, (2) a voice/sound detector, and (3) switch activation (e.g., a user selects a start button displayed upon a touch screen interface). Upon activation, the activated one of the interactive expert stations 101a-n, during step 310, sends a request via one of the connections 103 to the expert server 102. The request includes an identification of the particular interactive expert station as well as potentially additional customer-provided properties enabling further tailoring of expert/studio selection by the expert server 102.

At step 320 the expert server 102 receives the request from the activated interactive expert station and determines an appropriate expert/studio for fulfilling the request for commencing an interactive expert session. Initially, location and expertise router 112 of the expert server 102 consults the expert station location map 110 to determine the category of expert information/guidance with which the requesting interactive expert station is associated. Also during step 320 the expertise router 112 determines an appropriate expert/studio type in view of the identified category. The location and expertise router 112 then issues a request for a particular category of expert to the expert queuing and matching component 114 of the expert server 102 to facilitate establishing a consultation connection/session with that the requesting customer. In addition to a particular class/category of expert, the request submitted by the router 112 to the matching component 114 potentially includes additional properties (user knowledge level, preferred language, etc.) that are utilized by the matching component 114 to provide a more particularly tailored expert/studio selection to fulfill the received request for expert information/guidance.

Thereafter, at step 330 the expert queuing and matching component 114 consults its listings of expert/studio resources to determine the availability of an expert/studio matching the needs of request. In accordance with an illustrative embodiment, available experts/studios are placed in category-specific queues corresponding to the types of categories identified within the location map 11. However, in alternative embodiments, the breadth of the categories for the expert queues can differ considerably from the categories of stations identified in the location map 110. Such categories can combine station location-based categories to render broader categories. In other instances, a location-based category can be sub-divided based upon a number of factors, including, by way of example, the reasonable expected breadth of knowledge of the experts within a given category. Therefore, the expert queue categories need not correspond to the "location" (e.g., retail outlet department) identified for a particular interactive expert station in the location map 110.

With continued reference to step 330, if at least one such expert/studio is available in a queue corresponding to the type of expert specified by an expert request submitted by the router 112 to the expert queuing and matching component 114 (corresponding to the category of the expert request forwarded during step 310 the expert server 102 and potentially additional request properties), then control passes to step 340. At step 340, the matching component 114 removes an available expert/studio from the corresponding expert queue and pairs it with the expert request. If however, an expert/studio of the desired category/type is not available (i.e., there is a queue of stations currently waiting for the particular type of expert, the corresponding expert queue is currently empty, etc.), then control passes to step 350 wherein the request is placed in a queue of delayed expert requests associated with the currently empty corresponding expert queue. When a previously queued expert request reaches the head of the queue (and the original requestor has not abandoned the request) and a corresponding expert/studio becomes available, then control passes to step 340.

After matching a request to an available expert/studio, control passes to step 355 wherein the expert server 102 issues a notification to the requesting interactive expert station that identifies an expert/studio to which the expert station should establish a connection (represented by connections 107 in FIG. 1) supporting an interactive expert videoconference session between the expert station and the expert studio. The expert queuing and matching component 114 marks the status of the identified expert/studio as "busy." Alternatively, the expert studio receives the expert station's identification information and the session/connection is initiated by the expert studio.

Thereafter, during step 360 a videoconference session is carried out by the matched requesting interactive expert station at the retail outlet 100 and the expert/studio at the expert center 104. During the session, the expert utilizes a variety of resources, including database resources to perform a variety of tasks including, for example: accessing store inventory/pricing information, accepting/submitting customer orders for direct shipment, and determining the customer's request and current location. In addition, the expert is able to access any of a variety of multimedia content stored in the content store 116 of the expert server 102 and direct downloading of such content (if not already present) from the content store 116 to the connected interactive expert station at the retail outlet 100.

After the interactive expert session has run its course, the session completes during step 370. Thereafter, during step 370 the connection (of the connections 107) between the interactive expert station and the expert studio is terminated. At step 380 the expert/studio that completed the session notifies the expert queuing and matching component 114 of the expert center 102 that the session with the interactive expert station has ended, and the expert/studio is added to the corresponding expert queue maintained by the matching component 114 (e.g., the status of the expert studio is changed to "standby/ready").

It is noted in closing with regard to FIG. 3, that the above-described steps are merely illustrative of many possible ways in which to establish, carry out, and terminate interactive expert sessions in accordance with various embodiments of the present invention.

Figure 4:
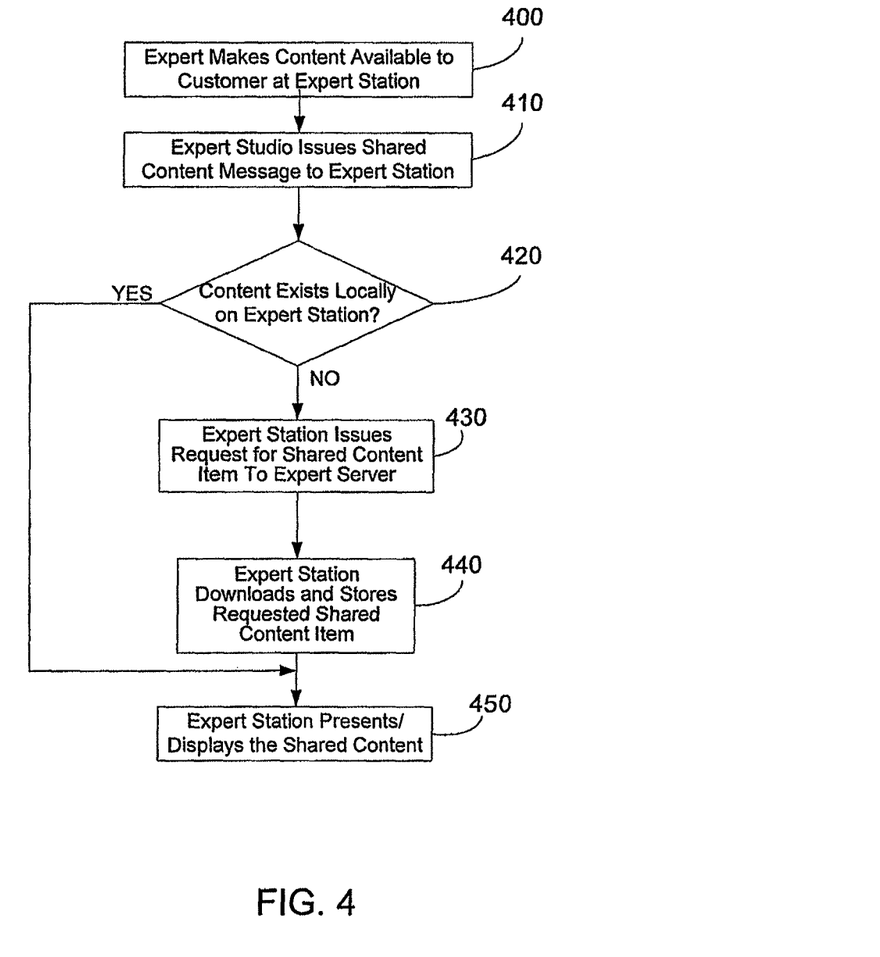
FIG. 4 is a flowchart depicting an exemplary set of steps associated with displaying shared content at an interactive expert station wherein content is downloaded via a separate on-demand connection.

Turning to FIG. 4, a set of steps summarize an illustrative method for downloading content for use by one of the stations 101a-n during an interactive expert session with one of the expert studios 106a-x via a connection separate from a connection supporting the station/studio session. The steps in FIG. 4, occur during the session corresponding to step 360 in FIG. 3. During step 400, an expert at one of the stations 106a-x makes content maintained by the expert server 102 available to a customer at one of the interactive expert stations 101a-n. Such access is provided, for example, by selecting a "share content" control at the expert's console after designating particular content (e.g., a short video clip, a PDF document, etc.) maintained within the content store 116. A message is transmitted via one of the connections 107 from the expert studio to the connected interactive expert station during step 410 instructing the expert station to display the shared content.

Upon receipt of the message from the expert studio, during step 420 the interactive expert station initially searches its local store of previously downloaded content to determine whether the content is already present in its local store (e.g., hard disk) associated with the interactive expert station. The local memory can be, for example on a dedicated in-store processor unit or, alternatively, a shared in-store processor (see FIG. 5, described herein below). If the shared content is not currently in the local store of the interactive expert station, then control passes to step 430. At step 430, the expert station issues a request, identifying the shared content and optionally an authorization key originally provided by the expert during step 410, to the expert server 102 via one of the connections 103. The connection that facilitates requesting and downloading the shared content from the expert server 102's content store 116 is "on-demand" in nature, and does not generally persist beyond a period for downloading the requested shared content. Thereafter, during step 440 the shared content is downloaded from the expert server 102 to the interactive expert station. The content downloaded during step 440 is stored in a local content cache maintained by the interactive expert station. The content thus persists on the interactive expert station beyond the current station/studio session. Automated garbage collection utilities on the interactive expert station purge stale content on an as-needed basis to ensure room exists for new content downloads. After storing the downloaded content in the local content cache, control passes to step 450. During step 450, the interactive expert station presents/displays the shared content for the user. If, at step 420, the shared content is already present in the local content cache of the interactive expert station, then control passes directly from step 420 to step 450.

Figure 5:
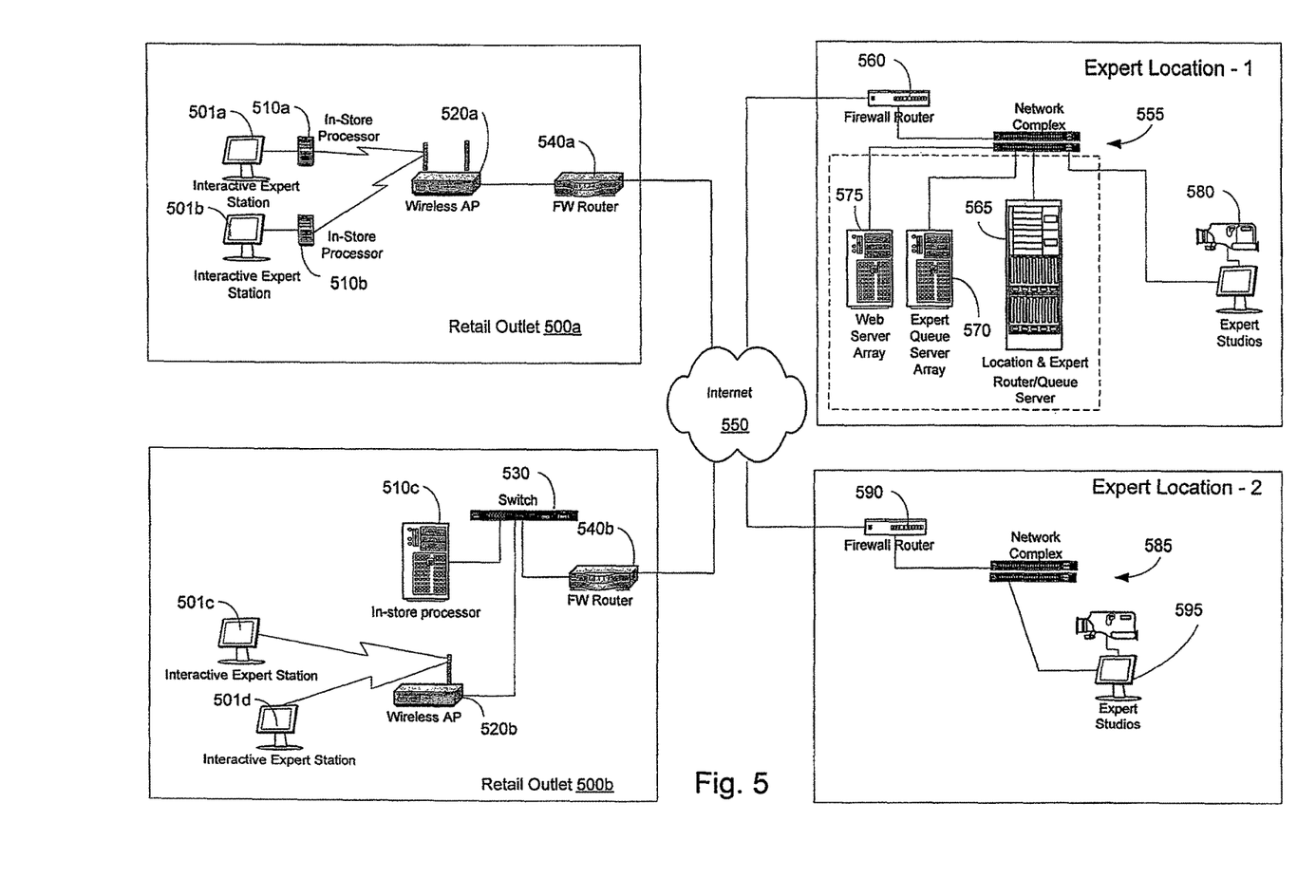
FIG. 5 is a schematic drawing depicting an exemplary network implementation of an interactive expert system including multiple locales housing expert studios.

Having provided a functional description of the interactive expert system in accordance with illustrative embodiments of the present invention, attention is directed to FIG. 5 that schematically depicts of an illustrative network arrangement for carrying out the functionality described with reference to FIGS. 1-4. Those skilled in the art will readily appreciate that there are many network arrangements suitable for carrying out the present invention. With reference to FIG. 5, the interactive expert stations 501a, 501b, 501c and 501d, associated with retail outlets 500a and 500b, are communicatively coupled to in-store processors 510a, 510b, and 510c. Expert stations 501a and 501b are each coupled to dedicated in-store processors 510a and 510b. However, expert stations 501c and 501d are coupled to a shared in-store processor 510c via a wireless access point 520b and network switch 530.

Wired/wireless connections are used alternatively according to the needs of particular retail outlet arrangements. In the case of the retail outlet 500a, each of the dedicated in-store processors 510a and 510b is connected to a wide-area network (e.g., Internet 550) via a wireless access point 520a. The wireless access point 520a is connected to a firewall router 540a that provides connectivity to the Internet 550. In the case of the retail outlet 500b, the shared in-store processor 510c is connected via a hardwire link to the switch 530. The switch 530 is connected to a firewall router 540b that provides connectivity to the Internet 550. It is noted that while the in-store processors 510a, 510b, and 510c are physically located in retail establishments in the illustrative example, in alternative embodiments, the in-store processors may not even be needed and the interactive expert stations are directly connected to an expert server and expert studios.

In the illustrative system arrangement depicted in FIG. 5, processing systems that carry out the functionality of the expert server 102 reside on a local area network 555 that also houses processing hardware for one or more expert studios. Local area network 555 is communicatively coupled to the Internet 550 via a firewall router array 560. A location and expert router system 565 carries out the functionality of the location map 110 and the location and expertise router 112. An expert queue server array 570 carries out the expert queuing and matching component 114 of the expert server 102. A web server array 575 implements the content store 116. While FIG. 5 depicts separate hardware for various expert server 102 functions and data, the functions and data can be combined into a fewer number of processing nodes on the local area network 555. Expert studios 580 represent additional nodes on the local area network 555. A second local area network 585, communicatively coupled to the Internet 550 via a firewall router array 590, hosts a second set of expert studios 595 in accordance with a multi-locale arrangement of the type depicted in FIG. 2.

The structures, techniques, and benefits discussed above are merely exemplary embodiments of the invention. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. An interactive expert system for facilitating interactive sessions between customers and experts based upon particular expertise designations assigned to particular ones of the experts, the system comprising:
    a set of interactive expert stations, each interactive expert station being associated with a current location;
    a set of expert studios providing expertise in potentially many different categories, each expert studio including an associated expertise; and
    an expert server for matching requests from the interactive expert stations to ones of the expert studios based upon a type of needed expertise, the expert server comprising:
        mapping information associating, with regard to the set of interactive expert stations, a current location with a type of expertise provided by one or more of the set of expert studios;
        a matching component for pairing a query from a requesting expert station of the set of interactive expert stations to an available expert studio of the set of expert studios based, at least in-part, upon the type of expertise associated with the current location of the requesting expert station, and thereafter initiating establishing a primary connection between the requesting expert station and the available expert studio.

2. The system of claim 1 wherein the expert server further comprises:
    a listing of currently available expert studios and associated expertise.

3. The system of claim 2 wherein the listing of currently available expert studios and associated expertise comprises a set of expert queues arranged, at least in part, based upon expertise of expert studios placed within particular ones of the queues.

4. The system of claim 1 wherein the associated current location corresponds to a physical location.

5. The system of claim 1 wherein the associated current location corresponds to a logical location.

6. The system of claim 1 wherein the expert studios comprise products in a simulated sales outlet environment corresponding to a particular type of expert station for which expertise is provided.

7. The system of claim 1 wherein the matching component further refines a search for the available expert studio based upon additional properties provided for a particular customer that initiated the query from the requesting expert station.

8. The system of claim 1 wherein the requesting expert station and the available expert studio include videoconference equipment.

9. The system of claim 1 further comprising a centralized content store, and wherein the requesting expert station comprises a network interface supporting a secondary connection, distinct from the primary connection, for downloading shared content from as remote content store during an interactive expert session supported by the primary connection.

10. The system of claim 9 wherein the requesting expert station includes a local content cache for storing shared content downloaded via the secondary connection, and wherein the local cache persists the downloaded shared content across multiple sessions.

11. A method for establishing and supporting interactive sessions between customers and experts in an interactive expert system comprising a set of interactive expert stations, a set of expert studios providing expertise in potentially many different categories, and an expert server for assigning requests from the interactive expert stations to available ones of the set of expert studios based upon particular expertise designations of particular ones of the expert studios, the method comprising the steps:
    associating each interactive expert station with a current location;
    associating each expert studio with an expertise;
    associating, with regard to the set of interactive expert stations, a current location and a type of expertise provided by one or more of the set of expert studios;
    receiving, by the expert server, a query for expertise from a requesting expert station of the set of interactive expert stations, and in response performing the further steps of:
        pairing the query to an available expert studio of the set of expert studios based, at least in-part, upon the type of expertise associated with the current location of the requesting expert station, and
        initiating establishing a primary connection between the requesting expert station and the available expert studio.

12. The method of claim 11 further comprising the step of:
    maintaining, by the expert server, a listing of currently available expert studios and associated expertise.

13. The method of claim 12 wherein the listing of currently available expert studios and associated expertise comprises a set of expert queues arranged, at least in part, based upon expertise of expert studios placed within particular ones of the queues.

14. The method of claim 11 wherein the expert studios comprise products in a simulated sales outlet environment corresponding to a particular type of expert station for which expertise is provided.

15. The system of claim 1 wherein the matching component further refines a search for the available expert studio based upon additional properties provided for a particular customer that initiated the query from the requesting expert station.

16. The method of claim 11 wherein the requesting expert station and the available expert studio include videoconference equipment and wherein the primary connection supports a videoconference session between the requesting expert station and the available expert studio.

17. The method of claim 11 further comprising:
    maintaining a centralized content store; and
    establishing a secondary connection, via a network interface on the requesting expert station, distinct from the primary connection, for downloading shared content from a remote content store during an interactive expert session supported by the primary connection.

18. The method of claim 9 wherein the requesting expert station includes a local content cache, further comprising:
    storing, within the local content cache, shared content downloaded via the secondary connection; and
    persisting the downloaded shared content, within the local content cache, across multiple sessions.

19. An interactive expert system for facilitating interactive sessions between customers and experts supporting on-demand downloading of shared content, the system comprising:
- an interactive expert station;
- an expert studio for providing live interactive expertise to the interactive expert station via a primary connection supporting a videoconference session between the interactive expert station and the expert studio;
- a centralized content store including shared content available for download to the interactive expert station via a secondary connection, distinct from the primary connection, in accordance with a direction issued from the interactive expert station to the expert studio during the videoconference session.

20. The system of claim 19 wherein the interactive expert station includes a local content cache for storing shared content downloaded via the secondary connection, and wherein the local cache persists the downloaded shared content across multiple sessions.

* * * * *